Patented Sept. 22, 1953

2,653,160

UNITED STATES PATENT OFFICE 2,653,160

PREPARATION OF ORGANOMETALLIC COMPOUNDS BY REACTION BETWEEN DRY DIAZONIUM COMPOUNDS AND METALLIC SALTS IN ORGANIC SOLVENTS

George O. Doak and Leon D. Freedman, Chapel Hill, N. C., assignors to the United States of America as represented by the Administrator of the Federal Security Agency No Drawing. Application August 30, 1951, Serial No. 244,454

6 Claims. (Cl. 260—442)

(Granted under Title 35, U. S. Code (1952), sec. 266)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to the preparation of organometallic compounds and more particularly to the preparation of organometallic compounds by reaction between dry diazonium compounds and metallic salts in organic solvents.

A few select organometallic compounds have been prepared prior to this invention, but in all such preparations, the process has contained many tedious manipulative steps. For example, it has been suggested that phosphonic acids may be prepared by starting with a hydrocarbon, adding thereto phosphorus trichloride in the presence of aluminum trichloride as a catalyst thereby obtaining $RPCl_2$. This compound is then treated with chlorine to obtain $RPCl_4$ which in turn is treated with water to obtain $RPO_3H_2$. Then for further synthesis of the particular phosphonic acid desired, it is necessary to substitute the particular organic group desired for the one present in the obtained phosphonic acid.

Therefore, it is an object of this invention to prepare organometallic compounds such as phosphonic and arsenic acids and the like without such a series of complex steps.

An additional object of the invention is to prepare organometallic compounds which have not been previously capable of easy preparation due to the particular characteristics of the various starting materials.

Additional objects and advantages of the invention will become obvious when considering the following description and examples of the invention.

These objects are accomplished in this invention by preparing organometallic compounds by mixing together a dry diazonium compound which is nonexplosive, at least at normal room temperatures and slightly above, and an organic substituted or unsubstituted non-ionic metallic or metalloid halide in the presence of an organic solvent and a catalyst.

As suitable diazonium compounds for our process, we have found that the diazonium compounds which may be dried without exploding are suitable. We have found that the compounds known as the diazonium fluoborates and fluosilicates with the general formula $RN_2BF_4$ and $(RN_2)_2SiF_6$ are ideal for this purpose. These compounds are known to be stable and are members of the few classes of diazo compounds which can be dried without fear of explosion.

As halides for the use of the process in this invention, there may be used non-ionic metallic halides including those with organic substituents such as $HgCl_2$, $SnCl_2$, $PbCl_2$, $RHgCl$, etc., and metalloid halides including those with organic substituents such as $AsCl_3$, $SbCl_3$, $PCl_3$, $BiCl_3$, $SiCl_4$, $RPCl_2$, $R_2PCl$, $RAsCl_2$, etc., where in the above formulae R is a substituted or unsubstituted aromatic or aliphatic radical.

The diazonium compound and halide are mixed together in the presence of an organic solvent. As solvents, a variety of solvents has been used such as alcohols (methyl, ethyl, isopropyl, tertiary butyl, etc.), ketones such as acetone, esters such as ethyl acetate, and ethers such as dioxane. Obviously when choosing the solvent to be used in the process of this invention, normal care should be taken not to use a solvent which itself will react with the starting material. It will be noted that an aqueous solvent is not used. Such a solvent cannot be used due to its possible violent reaction with the starting materials such as $PCl_3$.

As a catalyst for the reaction, there is used copper metal and its salts.

The reaction utilized in the invention is carried out at normal atmospheric pressure and is normally carried out at room temperature. Slight heating may be utilized to hasten the reaction if necessary or desired.

Upon hydrolysis of the products of the reaction, both mono- and di-acids of the general formulae $RMO_3H_2$ and $R_2MO_2H$ are formed. The reaction may be influenced by change in the catalyst, by change in the organic solvent, or by change in both catalyst and solvent to produce a preponderance of one or the other of these forms of the compound.

The following examples are illustrative of the particular reactions utilized to obtain particular organometallic compounds.

Example I p - Nitrobenzenediazonium fluoborate (23.7 grams) was suspended in 150 ml. of absolute alcohol in a flask equipped with a stirring device. 36.2 grams of arsenic trichloride was added followed by 2 grams of cuprous bromide. Nitrogen gas was evolved spontaneously. When all the nitrogen was evolved the mixture was steam distilled to remove the alcohol and by-products of the reaction and the residual liquid in the flask evaporated to 100 ml. and cooled. A mixture of p-nitrobenzenearsonic acid and bis(p-nitrophenyl) arsinic acid separated. This mixture was dissolved in sodium bicarbonate solution, filtered and the acids precipitated by acidification with hydrochloric acid. The p-nitrobenzenearsonic acid was then dissolved out of the mixture with hot water leaving the bis(p-nitrophenyl) arsinic acid behind. The p-nitrobenzenearsonic acid could then be obtained in a pure state by crystallizing from the water solution. In this manner 12.9 grams of p-nitrobenzenearsonic acid and 0.5 gram of bis(p-nitrophenyl) arsinic acid were obtained.

*Example II*

The reaction was conducted in a similar manner to the preceding example but 2 grams of copper bronze were substituted for the 2 grams of cuprous bromide. In this manner 5.31 grams p-nitrobenzenearsonic acid and 2.44 grams of bis(p-nitrophenyl) arsinic acid were obtained.

*Example III*

The reaction was conducted in a similar manner to the first example but 150 ml. of tertiary butyl alcohol was substituted for the 150 ml. of absolute ethyl alcohol. In this manner 8.21 grams of p-nitrobenzenearsonic acid and 2.39 grams of bis(p-nitrophenyl) arsinic acid were obtained.

*Example IV*

The reaction was conducted in a similar manner to the first example but 2 grams of cupric chloride were substituted for the cuprous bromide. In this manner 13.17 grams of p-nitrobenzenearsonic acid were obtained but only 0.12 gram of bis(p-nitrophenyl) arsinic acid.

*Example V*

The reaction was conducted in a similar manner to Example IV but 22.7 grams of p-chlorobenzenediazonium fluoborate was substituted for 23.7 grams of p-nitrobenzenediazonium fluoborate. In this manner 12.92 grams of p-chlorobenzenearsonic acid and essentially no bis(p-chlorophenyl) arsinic acid were obtained.

*Example VI*

Benzenediazonium fluoborate (19.2 grams) was suspended in 50 ml. of absolute alcohol, 22.8 grams of antimony trichloride dissolved in 100 ml. of absolute alcohol was added then 2 grams of cupric chloride. When all the nitrogen gas was evolved 150 ml. of concentrated hydrochloric acid was added and then a solution of 10 ml. of pyridine dissolved in 40 ml. of concentrated hydrochloric acid. A heavy precipitate formed which was removed by filtration and recrystallized from a mixture of alcohol and hydrochloric acid. The recrystallized precipitate was then dissolved in 2% sodium hydroxide solution and the solution acidified with hydrochloric acid when benzenestibonic acid precipitated. This was removed, washed and dried. In this manner 14.4 grams of pure benzenestibonic acid were obtained.

*Example VII*

Benzenediazonium fluoborate (38.4 grams), 27.4 grams of phosphorus trichloride and 4 grams of cuprous bromide were added to 250 ml. of absolute ethyl acetate, in a 3-necked flask equipped with a stirring device and a trap to catch the toxic vapors that were evolved during the reaction. After stirring for one and a half hours the mixture was heated on a water bath when nitrogen gas was evolved. When all the nitrogen was evolved 50 ml. of water was added and the mixture was steam distilled to remove ethyl acetate and by-products of the reaction. The residue in the flask was evaporated to 200 ml. and cooled when diphenylphosphinic acid separated from the solution. After purification of this compound by recrystallization 0.82 grams of pure diphenylphosphinic acid were obtained. The remaining liquid after removal of the diphenylphosphinic acid was evaporated to 50 ml., and cooled when benzenephosphonic acid separated from this mixture. This acid was purified by solution in sodium hydroxide, the solution was treated with decolorizing charcoal, and filtered. When the solution was acidified with hydrochloric acid an acid salt of benzenephosphonic acid separated. This was then recrystallized from 6 N hydrochloric acid. In this manner 7 grams of pure benzenephosphonic acid was obtained.

*Example VIII* p-Nitrobenzenediazonium fluoborate (118.5 grams), 68.7 grams of phosphorus trichloride and 8 grams of cuprous bromide were added to 600 ml. of ethyl acetate in 3-necked flask equipped with a stirring device and a trap to catch the toxic vapors evolved during the reaction. After stirring for 40 minutes a violent reaction occurred and nitrogen gas was evolved. When all the gas had come off 50 ml. of water was added and the mixture was steam distilled to remove ethyl acetate and by-products of the reaction. The residue in the flask was then evaporated to 600 ml. and cooled when bis(p-nitrophenyl)-phosphinic acid separated. On the recrystallization of this solid from 80% ethyl alcohol 4.4 grams of pure bis(p-nitrophenyl)-phosphinic acid were obtained.

The filtrate from the removal of the phosphinic acid was then evaporated to 125 ml. and cooled when p-nitrobenzenephosphonic acid separated from the solution. This was then dissolved in 50% potassium hydroxide solution, treated with decolorizing charcoal, evaporated again to 125 ml. and acidified with hydrochloric acid. The acid salt of p-nitrobenzenephosphonic acid then separated from solution. This was then recrystallized from 6N hydrochloric acid and finally from ether to give 61 grams of pure p-nitrobenzenephosphonic acid.

*Example IX* p-Nitrobenzenediazonium fluoborate (23.7 g.) and 125 ml. of ethyl acetate were placed in a 3-necked flask equipped with a mechanical stirrer, a thermometer, and a gas outlet tube connected to a water trap. Stirring was begun and then 13.5 ml. of phenyldichlorophosphine and 2 g. CuBr were added. In about 12 minutes a reaction occurred, during which there was a rapid increase in temperature and a vigorous evolution of gases. When no more gas was being evolved, 50 ml. of water was added and the mixture was steam-distilled to remove the ethyl acetate and volatile by-products of the reaction. The residual liquid in the flask was evaporated to about 100 ml. and cooled. The precipitate was filtered off, dissolved in 10% sodium bicarbonate solution, treated with decolorizing charcoal, and then reprecipitated by the addition of concentrated hydrochloric acid solution. This solid was recrystallized twice from 95% alcohol. The yield of (p-nitrophenyl)phenylphosphinic acid was 8.5 grams.

What is claimed is:

1. The method of preparing organometallic compounds which comprises mixing together a dry diazonium compound selected from the group consisting of diazonium aryl fluoborates and aryl diazonium fluosilicates and a halide selected from the group consisting of $HgCl_2$, $SnCl_2$, $PbCl_2$, $RHgCl$, $AsCl_3$, $SbCl_3$, $PCl_3$, $BiCl_3$, $SiCl_4$, $RPCl_2$, $R_2PCl$, and $RAsCl_2$ wherein R is an organic radical selected from the group consisting of the substituted and unsubstituted aromatic and aliphatic radicals, under substantially anhydrous conditions in the presence of an organic solvent and a catalyst selected from the group consisting of copper metal and copper salt and hydrolyzing the reaction products to produce the mono- and di-acids thereof.

2. The method of preparing organometallic compounds of phosphorus which comprises mixing together a compound selected from the group consisting of aryl diazonium fluoborates and aryl diazonium fluosilicates and phosphorus trichloride, under anhydrous conditions in the presence of an organic solvent and a catalyst selected from the group consisting of copper metal and copper salts and hydrolyzing the reaction products to produce the mono- and di-acids thereof.

3. The method of preparing organometallic compounds of arsenic which comprises mixing together a compound selected from the group consisting of aryl diazonium fluoborates and aryl diazonium fluosilicates and arsenic trichloride, under substantially anhydrous conditions in the presence of an organic solvent and a catalyst selected from the group consisting of copper metal and copper salts and hydrolyzing the reaction products to produce the mono- and di-acids thereof.

4. The method of preparing organometallic compounds of silicon which comprises mixing together a compound selected from the group consisting of aryl diazonium fluoborates and aryl diazonium fluosilicates and silicon tetrachloride under substantially anhydrous conditions in the presence of an organic solvent and a catalyst selected from the group consisting of copper metal and copper salts and hydrolyzing the reaction products to produce the mono- and di-acids thereof.

5. The method of preparing organometallic compounds of antimony which comprises mixing together a compound selected from the group consisting of aryl diazonium fluoborates and aryl diazonium fluosilicates and antimony trichloride, under substantially anhydrous conditions in the presence of an organic solvent and a catalyst selected from the group consisting of copper metal and copper salts and hydrolyzing the reaction products to produce the mono- and di-acids thereof.

6. The method of preparing organometallic compounds of phosphorus which comprises mixing together a compound selected from the group consisting of aryl diazonium fluoborates and aryl diazonium fluosilicates and phenyldichlorophosphine, under anhydrous conditions in the presence of an organic solvent and a catalyst selected from the group consisting of copper metal and copper salts and hydrolyzing the reaction products to produce the mono- and di-acids thereof.

GEORGE O. DOAK.
LEON D. FREEDMAN.

References Cited in the file of this patent

UNITED STATES PATENTS

| Number | Name | Date |
| --- | --- | --- |
| 1,061,587 | Bart | May 13, 1913 |
| 1,704,106 | Scheller | Mar. 5, 1929 |
| 2,423,359 | Wiley | July 1, 1947 |

FOREIGN PATENTS

| Number | Country | Date |
| --- | --- | --- |
| 569,037 | Great Britain | May 2, 1945 |

OTHER REFERENCES

Ruddy et al.: J. Am. Chem. Soc., vol. 64, pp. 828–9 (1942).

Dunher et al.: J. Am. Chem. Soc., vol. 58, pp. 2308–9 (1936).

Starkley: J. Am. Chem. Soc., vol. 59, pp. 1479–1480 (1937).